United States Patent
Naeyaert

(10) Patent No.: US 7,287,782 B2
(45) Date of Patent: Oct. 30, 2007

(54) DEVICE FOR HOLDING TWINES IN A KNOTTER

(75) Inventor: Karel O. R. Naeyaert, Zedelgem (BE)

(73) Assignee: CNH America LLC, New Holland, PA (US)

(*) Notice: Subject to any disclaimer, the term of this patent is extended or adjusted under 35 U.S.C. 154(b) by 335 days.

(21) Appl. No.: 11/106,420

(22) Filed: Apr. 14, 2005

(65) Prior Publication Data
US 2006/0108806 A1   May 25, 2006

(30) Foreign Application Priority Data
Oct. 6, 2004   (GB) ................. 0422045.5

(51) Int. Cl.
*A01D 59/04* (2006.01)
(52) U.S. Cl. ......................................... 289/2
(58) Field of Classification Search ............. 289/13–15
See application file for complete search history.

(56) References Cited

U.S. PATENT DOCUMENTS 3,370,875 A * 2/1968 Grillot ..................... 289/14
4,142,746 A * 3/1979 White ....................... 289/2
4,223,516 A * 9/1980 Vansteelant ............... 56/343
4,420,177 A * 12/1983 Munro et al. ............. 289/14

FOREIGN PATENT DOCUMENTS

GB    2051889 A    6/1979
GB    2079330 A    7/1980

* cited by examiner

*Primary Examiner*—Shaun R. Hurley
(74) *Attorney, Agent, or Firm*—Patrick M. Sheldrake; John William Stader; Michael C. Harms

(57) ABSTRACT

A device for firmly holding the twines in an agricultural knotter as they are being knotted and cut. The length and geometry of the curved edge of the twine holding device are such that the clamping pressure on the twines in one notch is only released after the twines have been securely gripped within the next notch in succession.

6 Claims, 2 Drawing Sheets

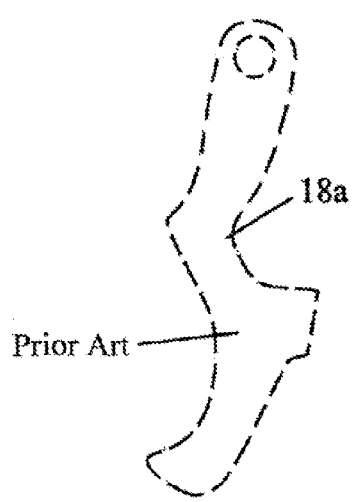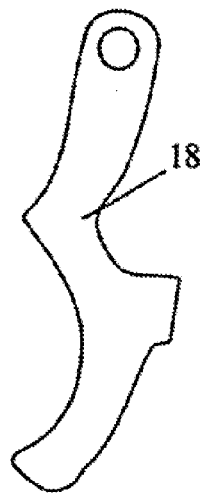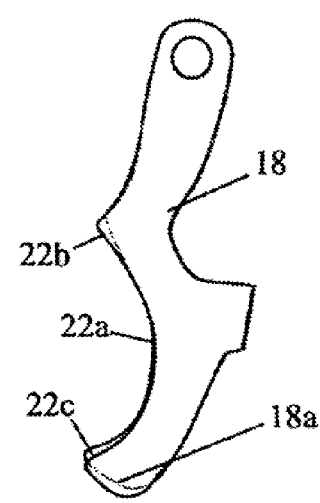
Fig. 3   Fig. 4   Fig. 5
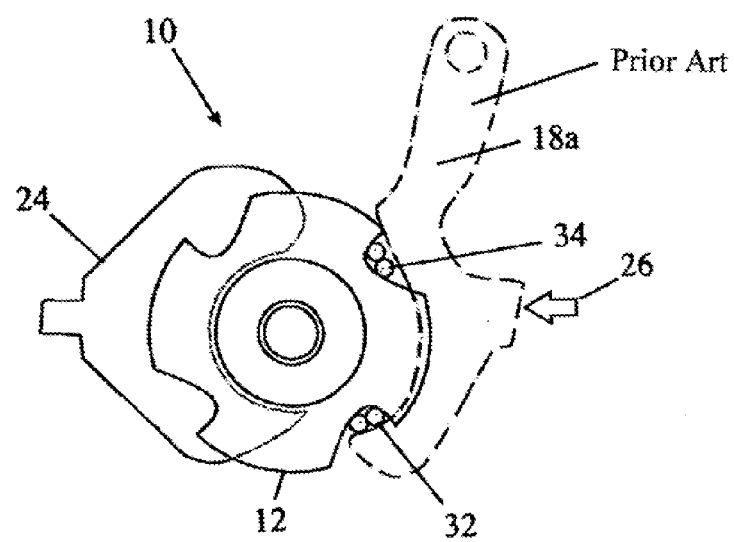
Fig. 6

DEVICE FOR HOLDING TWINES IN A KNOTTER

BACKGROUND OF THE INVENTION

The present invention relates generally to a knotting mechanism, and more particularly to a device which forms part of a knotter that is used in an agricultural baler to tie together the ends of lengths of twine wrapped around the crop material.

A baler is an agricultural machine that picks up crop from the field and gathers them into bales, which can be either square or round. In the case of a square baler, the bales are made in a baling chamber that has a rectangular cross section. The crop picked up from the ground is fed into a feed chute. When the feed chute is full, its contents are partly compressed and pushed upwards by a paddle into the baling chamber. The baling chamber has a reciprocating plunger that compresses this "slice" of crop by pushing it deeper into the baling chamber and the process is repeated for successive slices until the bale has the desired length. At this point, loops of twine are tied around the crop to keep it as a compressed bale. This bale is discharged onto the ground by the next bale that is being formed into the baling chamber and that pushes against the previously formed and finished bale.

Rectangular bales conventionally are able to maintain their shape by means of a series of parallel extending twine loops, provided lengthways around the bales. Agricultural balers, utilizing automatic knotters by whom two conventional knots are made on every loop for binding a bale, have been available for many years.

When a bale reaches its desired length, a knot tying cycle is started. During this tying cycle, two knots are formed, the first knot for closing the loop of the finished bale and the second knot for starting the loop for the next bale.

The construction of such balers is well known and is fully documented in numerous prior art references. For this reason, a more detailed explanation of the baler is not deemed to be necessary within the present context.

The present invention relates to the operation of the knotter. Once again, the construction of knotters is known and they will only be described herein briefly to explain the background of the invention. The main part of the knotter is a billhook that engages the twines to be tied together while they are held under tension. The billhook is rotated through 360° about an axis perpendicular to the twines and in the process wraps a loop of the twines around itself. The twines are next pulled through the loop that has been created by the rotation of the billhook. The twines are now cut and the free end of the twines thus created is pulled through the loop to complete the knot. For a fuller explanation of the operation of the knotter, reference may be made for example to U.S. Pat. No. 4,142,746.

As explained above, the billhook needs to operate on a length of twine that is maintained under tension. This is achieved by firmly holding the twine on one side of the billhook. On the other side of the billhook, the runs of the twine connected to the supply rolls are each tensioned by a friction clamp and a spring biased arm.

The present invention relates to the holding device used to grip the twines firmly while they are being knotted and cut. The holding device used in some balers currently in production, comprises a rotatably mounted generally circular twine disc having radial notches symmetrically distributed about its periphery. A twine holder, pivotably mounted about an axis parallel to the axis of rotation of the twine disc is resiliently urged toward the centre of the disc. The holder has a curved edge, which co-operates with the notches in the twine disc to trap and clamp the twines within the notches as the twine disc rotates. At least one of the twine disc and holder is made up of several axially spaced plates and the twines are clamped by forming several bends in them as the individual plates of the twine disc and the twine holder are interleaved with one another.

During a cycle of operation of the knotter, the twines are first brought by the needle past the billhook and over the twine disc of the holding device. The twine disc is rotated a first time to trap the twines in one of its notches and to draw the twines to a position in correct alignment with the billhook. The twine disc is rotated a second time while the needle is retracted to trap a second portion of the twines into the next notch of the twine disc.

Simultaneously, the billhook is rotated to form its first knot and once this knot is finished, a moving knife cuts the twines and the finished knot is stripped of from the billhook by a stripper blade, thus closing the loop of twine of the finished bale. Because the twine disc holds the twines into two separate notches, the billhook can start to form its second knot even with the first knot already cut from the remaining twine. Then, the second knot will be formed, cut by the knife and stripped from the billhook by the stripper blade. A new knotting cycle will start once a new bale reaches its desired length.

A problem that often occurs with these holding devices is that after the first knot is formed, the continued rotation of the twine disc releases the twines from one of the notches from the twine disc. In this case, the knotter will not be able to knot a perfect second knot since the twines are no longer firmly held by the twine disc.

It would be a significant advantage to develop an improved holding device that reduces or eliminates the above-described problems.

SUMMARY OF THE INVENTION

Accordingly, it is an object of the present invention to provide an improved twine holding device that reduces the risk of malfunction of the knotter.

Another object of the present invention is to provide a holding device for use in a knotter of a baler to grip and hold twines as they are being knotted and cut.

It is another object of the instant invention to provide a twine gripping device with a rotatably mounted generally circular twine disc having notches symmetrically distributed about its periphery.

Yet another object of the present invention is to provide a twine holder having a curved edge that cooperates with the notches in the twine disc to clamp twines within the notches as the twine disc rotates.

These and other objects are attained by providing a device for firmly holding the twines in an agricultural knotter as they are being knotted and cut. The length and geometry of the curved edge of the twine holding device are such that the damping pressure on the twines in one notch is only released after the twines have been securely gripped within the next notch in succession.

According to the present invention, there is provided a holding device for use in a knotter of a baler to grip hold twines as they are being knotted and cut, the device comprising a rotatably mounted generally circular twine disc having notches symmetrically distributed about its periphery, and a twine holder mounted for pivotal movement about an axis parallel to that of the twine disc and resiliently urged towards the latter, the twine holder having a curved edge that cooperates with the notches in the twine disc to clamp twines within the notches as the twine disc rotates, characterized in that the length and geometry of the curved edge of the twine holder are such that the clamping pressure on the twines in one notch is only released after twines have been securely gripped within the next notch in succession.

In the preferred embodiment of the invention, the curved edge of the holding device comprises a generally arcuate central portion centered on the axis of rotation of the twine disc, a lead-in region at one end of the central portion and a lead-out region at the opposite end of the central portion, the circumferential distance between the lead-in and lead-out portions being substantially equal to the circumferential distance between the notches in the twine disc.

Advantageously, the lead-in region has a reduced radius of curvature and the lead-out region has an increased radius of curvature, as compared to the central portion of the curved edge, such that the pressure on the twines in one notch is gradually reduced at the same time as pressure applied to the twines in the next notch is gradually increased.

Conveniently, the twine disc may comprise two axially spaced plates and the twine holder consists of a single plate sized and positioned to be received between the plates of the twine disc.

In the prior art, the edge of the holder acting to grip the twines in a notch could only apply pressure in one notch at a time. The presence of twine in one notch inhibited the movement of the twine holder and prevented it from gripping the twines in the second notch. The present invention is predicated on the realization that with the twine holder constructed in such a manner, it is inevitable that during the changeover there is a time when the twines are securely gripped in neither notch. If the twines are pulled back by the billhook or by the tensioning arms at a time when they are not secured gripped, then some twine may be allowed to move back towards the billhook and the resulting loss of tension can cause malfunction of the knotter or the knife.

BRIEF DESCRIPTION OF THE DRAWINGS

The advantages of this invention will be apparent upon consideration of the following detailed disclosure of the invention, especially when taken in conjunction with the accompanying drawings wherein:

FIG. 3 is a view of a conventional twine holder;

FIG. 4 is a view, similar to FIG. 3, showing the twine holder on the holding device shown in FIGS. 1 and 2;

FIG. 5 is a view of the twine holder of FIG. 4 rendered partially transparent and overlaying the twine holder of FIG. 3; and FIG. 6 is a view, similar to FIG. 2, showing a holding device comprising the conventional twine holder of FIG. 3.

DESCRIPTION OF THE PREFERRED EMBODIMENT

Figure 1:
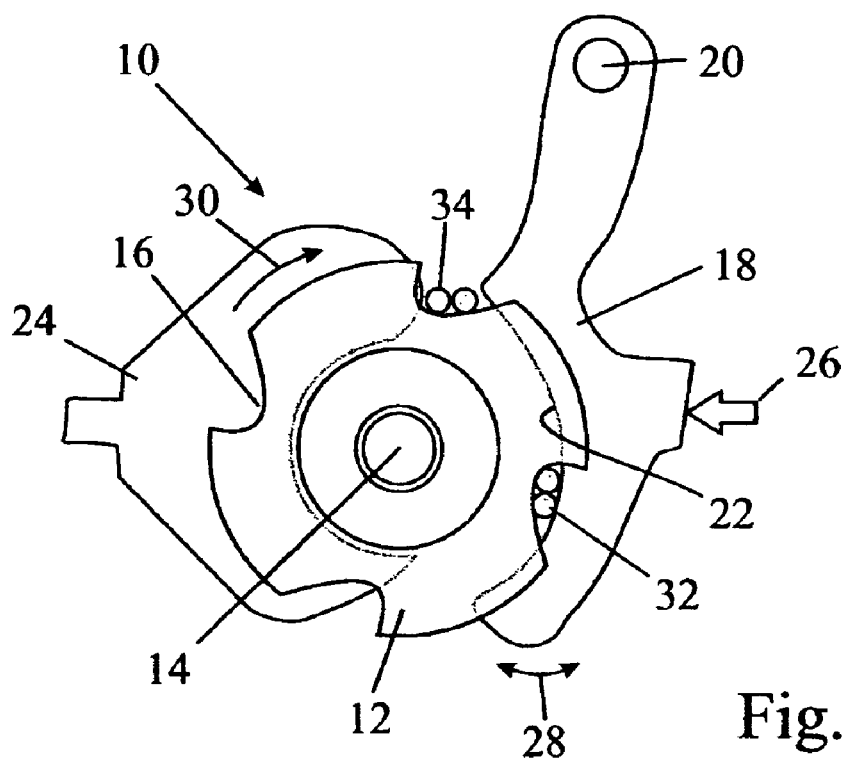
FIG. 1 is a front view of a holding device in a first position.

The twine holding device 10 in the drawings comprises a twine disc 12 which is circular and rotates about a shaft 14 in the direction of the arrow 30 in FIG. 1. The disc 12 is formed of two parallel axially spaced plates. As the plates are in exact axial alignment with one another, only one plate is visible in the drawings. Each of the plates of the twine disc 12 is formed with four notches 16 that are uniformly distributed about its circumference.

A twine holder 18 is mounted on a pin 20 for pivotal movement about an axis parallel to that of the shaft 14, as represented by an arrow 28 in FIG. 1. The twine holder 18 preferably comprises a single flat plate that fits between the two plates of the twine disc 12 but it may alternatively comprise a plurality of such plates interleaved with the plates of the twine disc 12. The twine holder 18 is resiliently urged to rotate clockwise as viewed about the pin 20 by means of a spring represented schematically by an arrow 26. When twines are trapped in the notches 16 by the twine holder 18, as is the case with the twines designated 32 in FIG. 1, they are forced to bend around the edges of the plates of the twine disc 12 and the twine holder and they are thereby gripped firmly.

After the twines 32 and 34 have been separately cut during a knotting cycle of the baler, a short length of twine remains entangled between the plates of the twine disc and a stationary stripper plate 24 that fits between the plates of the twine disc removes these lengths of twine as the disc rotates in the direction of the arrow 30.

As so far described, the twine holding device is conventional and the present invention differs from the prior art in the shape of the twine holder 18 and in particular in the shape of the curved edge 22 of the twine holder 18. FIG. 4 shows a twine holder 18 of the invention, whereas FIG. 3 shows a conventional twine holder 18a. At first sight, they look similar but FIG. 5 allows a closer comparison because the two twine holders 18 and 18a of FIGS. 3 and 4 have been placed one above the other.

In the central region 22a of the curve 22, both twine holders are an arc centered on the axis of the shaft 14. This is a requirement if uniform tension is to be maintained to grip the twines as the twine disc 12 rotates. The two twine holders 18 and 18a however differ from one another in three respects. First, the twine holder 18 of the invention is slightly longer. Second, it has a lead-in region 22b of reduced radius of curvature and a lead-out region 22c of increased radius of curvature. The effect of these apparently small changes is most readily apparent from a comparison of FIGS. 2 and 6.

Figure 2:
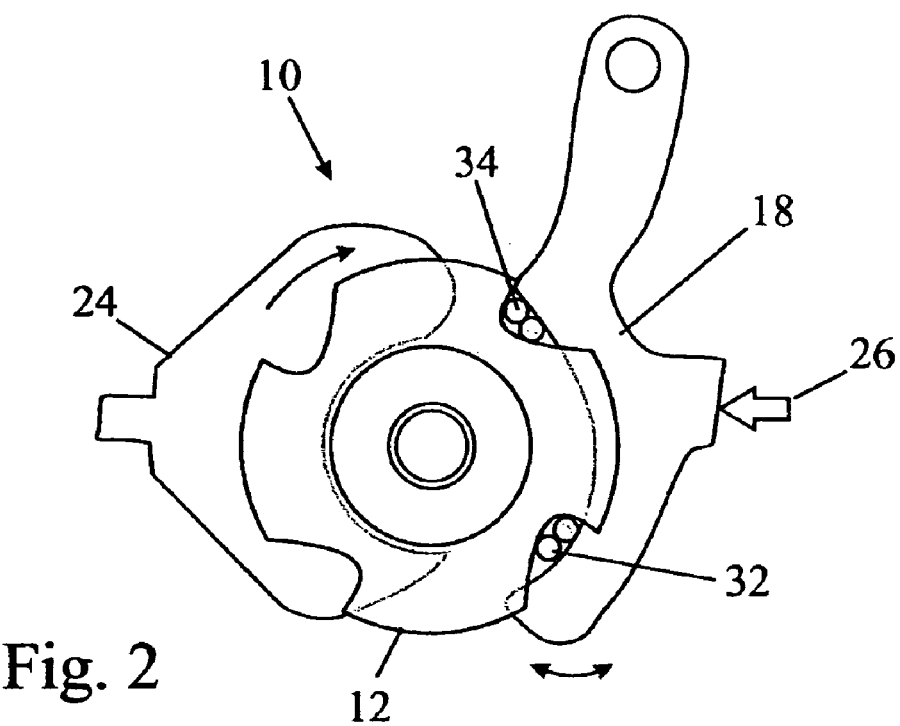
FIG. 2 is a front view, similar to FIG. 1, showing the holding device of FIG. 1 with the twine disc rotated into a different position.

In FIG. 2, it can be seen that the two sections 32 and 34 of the twines in the two notches 16 are gripped at the same time whereas in FIG. 6, the first gripped section 32 of the twines prevents the second section 34 from being gripped. As a result, in the prior art as represented by FIG. 6, only after the sections of 32 are rotated free of the twine holder is the latter capable of gripping the next section 34. If the twines are pulled during the transition from one gripping notch to the next, some twine can be drawn back towards the billhook and the presence of slack can interfere with the operation of both the billhook and the knotter.

However, by using the modified twine holder 18 of FIG. 4, the present invention ensures that the section 34 of the twines is gripped before the section 32 is released and at no time from the commencement of a knotting cycle until the completion of the second knot is movement of the twines permitted relative to the holding device 10.

Having thus described the invention, what is claimed is:

1. A holding device for use in a knotter of a baler to grip twines as they are being knotted and cut, the holding device comprising:

a rotatably mounted generally circular twine disc having notches symmetrically distributed about its periphery, the twine disc being mounted for rotation about a first axis;

a twine holder mounted for pivotal movement about a second axis generally parallel to the first axis and resiliently urged towards the latter, the twine holder having a curved edge that co-operates with the notches in the twine disc to clamp twines within the notches as the twine disc rotates, the length and geometry of the curved edge of the twine holder being such that the clamping pressure on the twines in one notch is only released after twines have been securely gripped within the next notch in succession and the clamping pressure on the twines in two successive notches, during the time prior to release of the clamping pressure from one notch, is sufficient to prevent movement of the twines, relative to the holding device, in both notches.

2. The holding device claim 1, wherein:

the curved edge of the holding device comprises a generally arcuate central portion centered on the first axis, a lead-in region at one end of the central portion and a lead-out region at the opposite end of the central portion, the circumferential distance between the lead-in and the lead-out portions being substantially equal to the circumferential distance between the notches in the twine disc.

3. The holding device of claim 2, wherein:

the lead-in region has a reduced radius of curvature and the lead-out region has an increased radius of curvature, as compared to the central portion of the curved edge such that the pressure on the twines in one notch is gradually reduced at the same time as pressure applied to the twines in the next notch is gradually increased.

4. The holding device of claim 3, wherein:

the twine disc comprises at least two axially spaced plates and the twine holder comprises at least one single plate sized and positioned to be received between the plates of the twine disc.

5. The holding device of claim 1, wherein:

the twine disc comprises at least two axially spaced plates and the twine holder comprises at least one single plate sized and positioned to be received between the plates of the twine disc.

6. The holding device of claim 2, wherein:

the twine disc comprises at least two axially spaced plates and the twine holder comprises at least one single plate sized and positioned to be received between the plates of the twine disc.

* * * * *